April 6, 1948.     E. F. GIBIAN     2,439,246
PRESSURE WELDING MACHINE
Filed March 11, 1944     3 Sheets-Sheet 3
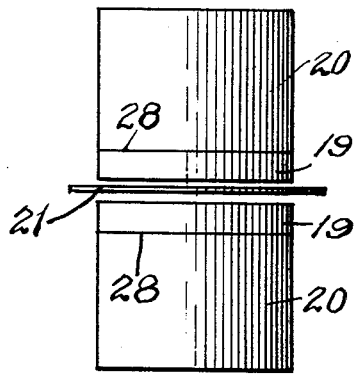
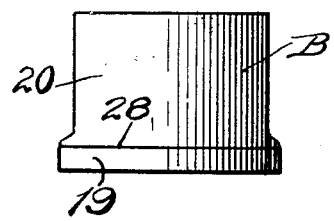
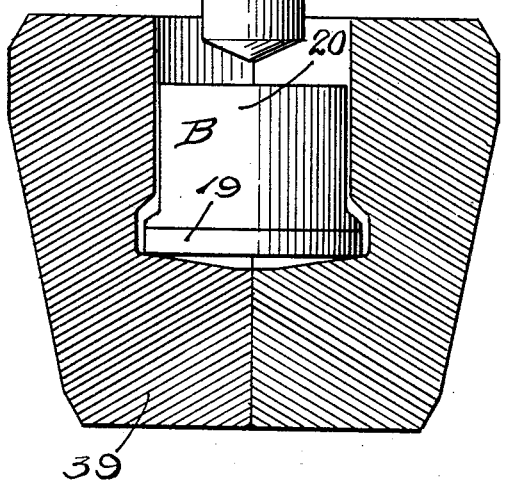
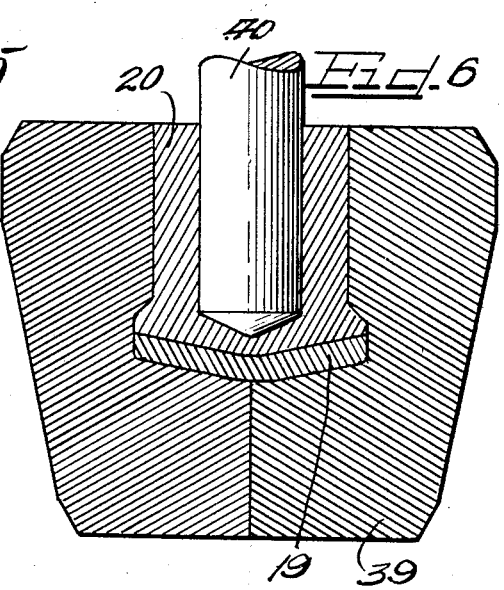
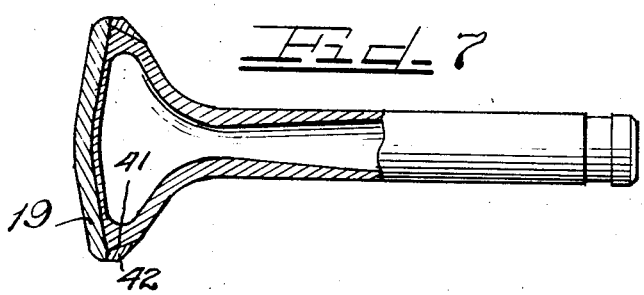
Inventor
Emil F. Gibian Patented Apr. 6, 1948

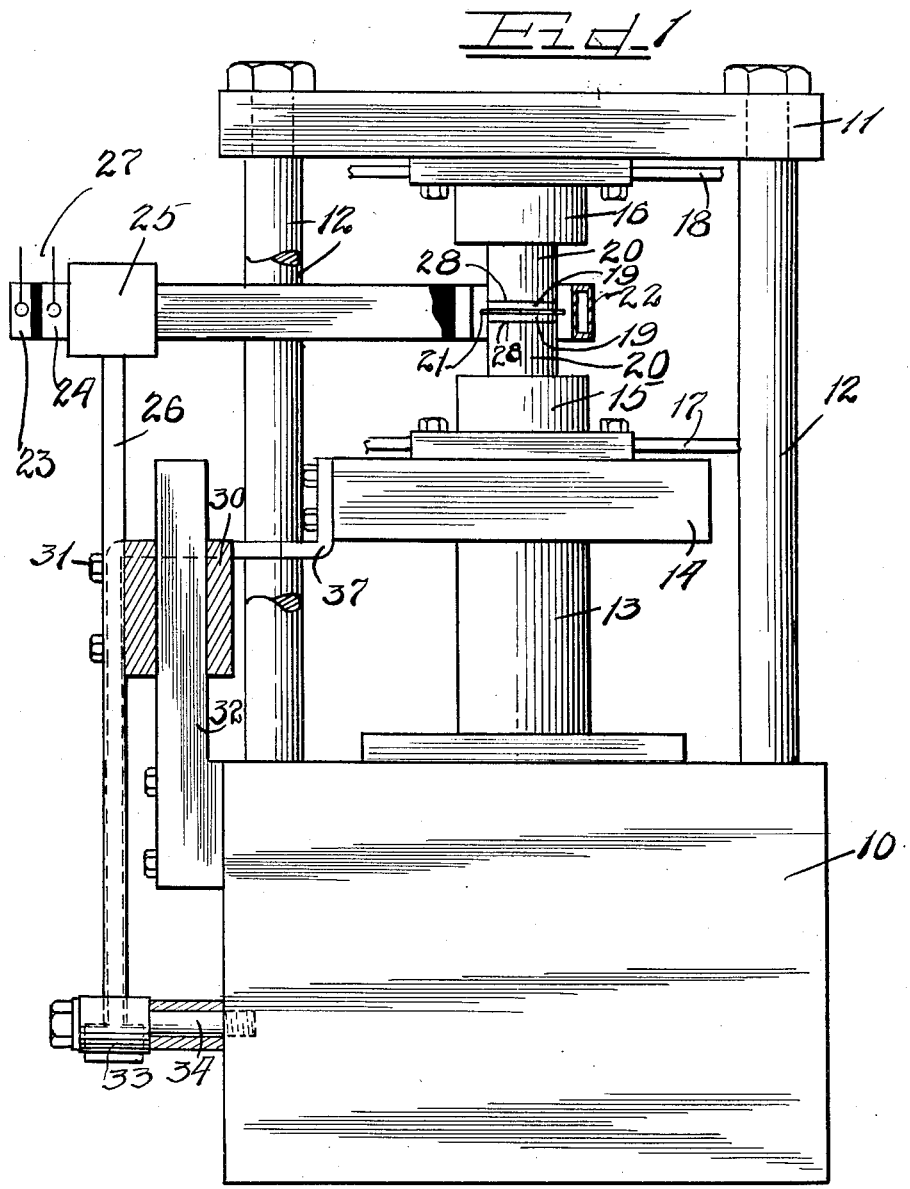

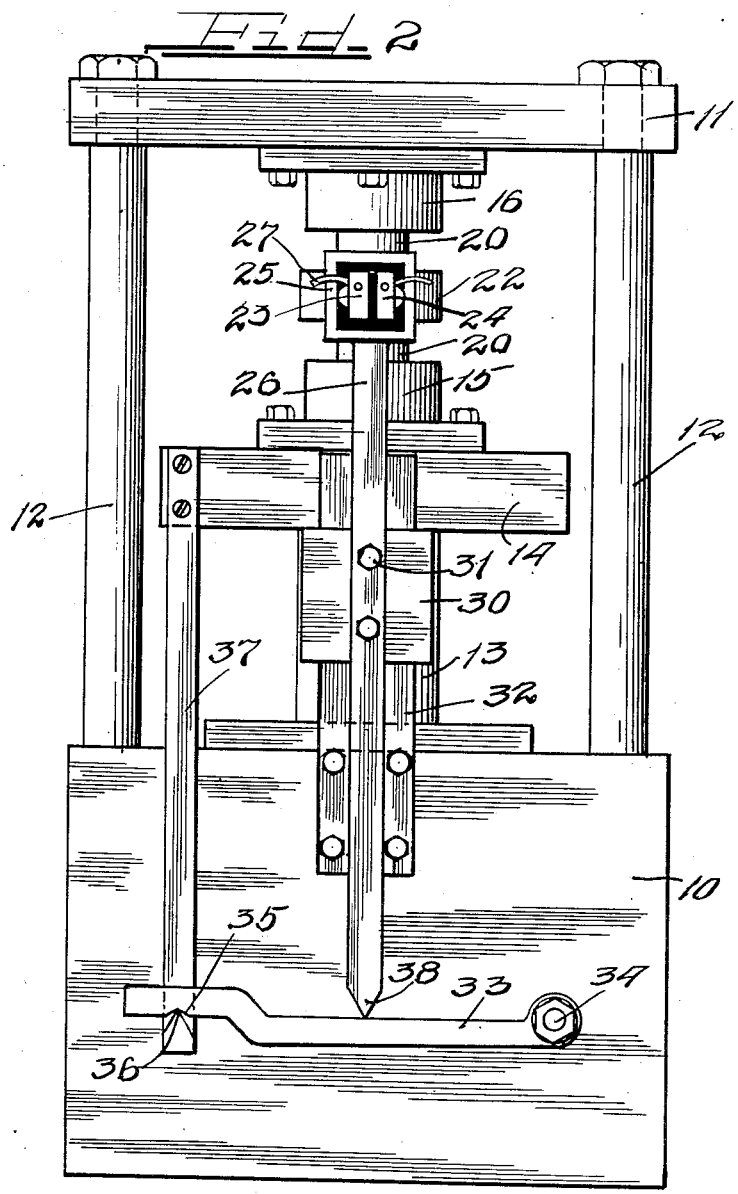

2,439,246

UNITED STATES PATENT OFFICE 2,439,246

PRESSURE WELDING MACHINE

Emil F. Gibian, Cleveland Heights, Ohio, assignor to Thompson Products, Inc., a corporation of Ohio Application March 11, 1944, Serial No. 526,076

2 Claims. (Cl. 219—4)

This invention relates to a pressure welding apparatus for the production of composite metal blanks or articles such as, for example, poppet valves suitable for use as exhaust valves in aircraft engines or other internal combustion engines. The invention includes a high-frequency current electric welding press and more specifically relates to a pressure welding apparatus for the production of composite hollow poppet valves composed of stress-resistant body metal and having the head and seating face thereof clad with a corrosion-resistant alloy, the body metal effectively resisting the strains and stresses and the head and seating face metal effectively resisting corrosion.

An important object of this invention is to provide improved pressure welding apparatus for producing bi-metallic or composite metal billet blanks which, by piercing and extrusion, forging and other treatments are adapted to be formed into poppet valves, the assembly for each billet blank comprising a comparatively thick cylindrical billet of valve body metal and a comparatively thin disk of corrosion-resistant metal or alloy, these two metal parts being intimately welded together and upset around the welding line.

Another object of the invention is to provide a welding press in which the desired alignment between the work and a welding head is maintained even during upsetting of the work.

A further object of the invention is to provide an improvement over present machines for pressure welding, this improvement being accomplished through the use of induction heating in the pressure welding machine in which the metal parts to be welded together are surrounded at the welding line by a coil through which high frequency alternating current flows.

Another object is to provide a machine to so produce the billet blanks by induction heating and pressure welding that they will not require machining or forging preparatory to the piercing operation, thus reducing wastage of material and eliminating considerable labor.

A further object is to provide a machine to produce two billet blanks in each pressure welding operation by axially aligning two billet forming metal assemblies in the press with the disk members opposed to each other, and with the induction heating loop surrounding both welding lines.

Still a further object is to provide an arrangement for maintaining the heating loop or ring in alinement with the welding line for uniform heating of the metal parts for the upsetting of the metal adjacent to the welding line.

Other and further objects of the invention will be apparent to those skilled in the art from the following detailed description of the annexed sheets of drawings, which by way of preferred example, illustrate preferred embodiments of the invention.

On the drawings:

Figure 1 is a front elevation of a hydraulic pressure welding machine and the heating structure and control therefor;

Figure 2 is a side elevation;

Figure 3 shows the assembly of two embryo billet assemblies before application thereof in the press;

Figure 4 shows a finished billet blank;

Figure 5 shows a piercing die in cross section with a billet blank therein ready for the piercing operation.

Figure 6 shows the application of the piercing punch and resulting form of the billet blank; and Figure 7 is a side elevation, partly in section, of a finished poppet valve resulting from further operation of the billet of Figure 6.

The press structure shown comprises the base structure 10 and the top structure 11 rigidly connected thereto by tension bars 12. By means not shown but well understood in the art, a ram piston 13 is hydraulically operable in the base structure 10 for vertical movement of the ram head 14. Secured on the ram head is an anvil 15, and secured to the upper press structure 11 is the anvil 16, these anvils being water-jacketed for cooling flow therethrough from piping 17 and 18, respectively.

Referring to Figures 1 and 3 the two billet assemblies which are to be simultaneously welded in the press comprise each a relatively thin billet or disk 19 and a thicker billet 20. These two billet assemblies are placed in the press between the anvils 15 and 16 with the thin billets or disks in opposition and with a layer or sheet 21 of insulating and heat-resisting material such as mica therebetween. The metal of the thicker billet 20 which eventually goes into the body of a poppet valve may be basic valve steel while the thinner disk may be of material which will form the corrosion resistant covering for the valve head.

Induction heating apparatus is shown for producing the welding heat. This apparatus comprises the one turn induction coil or loop 22 composed of a block of current-conducting metal such as copper supported at the end of terminal bars 23 and 24 mounted in but insulated from a housing 25 at the upper end of a support bar 26. A high frequency alternating current circuit 27 is connected with the terminal bars for flow of current through the coil 22. The current input is about 12,000 amperes, 24 volts and 9600 cycles. As shown, the terminal bars may be integral with the coil 22. The coil and bars are preferably hollowed out so that coolant such as water can be flowed therethrough. The coil is supported to surround the two work assemblies concentric therewith, and the coil is of a width to include both welding lines 28 between disks 19 and billets 20. To be symmetrical the coil should extend equi-distances above and below the mica separator 21. The work assemblies being of magnetizable material, they will function as a core for the coil 22 so that, upon current flow through the coil, the two work assemblies will be simultaneously heated by induction in the zones of their welding lines 28, and when the heat reaches a welding temperature, the press pressure will cause the engaging surfaces at the welding lines to be intimately welded together and the metal in the welding zone upset radially a distance above and below the welding lines, so that, after the welding operation, the two resulting composite billet blanks will each have the form shown in Figure 4. Press pressure is quite high and seals off the contacting surfaces forming the weld line from oxidizing air. Pressures of about 4000 to 6000 pounds per square inch of contacting area can be used, but the optimum sealing pressure will depend upon the type of metals being welded.

During the welding operation, the insulating sheet 21 separates the two work assemblies at their meeting line, and as the assemblies are being upset, the inductor coil 22 should move upwardly to remain symmetrical to the plane of the insulating sheet during the entire welding operation so as to equally heat the assemblies at opposite sides of the sheet. As both the upper and lower assemblies upset evenly as the ram head 14 moves upwardly, the meeting line between the two assemblies will move upwardly at half the rate of travel of the ram and therefore the coil 22 must be moved upwardly at half the rate of upward movement of the ram in order to maintain its symmetrical relationship with the two work assemblies. To accomplish this, elevating mechanism is provided for the inductor coil structure for the required movement thereof. The supporting bar 26 for the inductor coil structure is secured to a sleeve 30, as by screws 31, the sleeve being slidable on a post 32 secured to and extending upwardly from the base structure 10. Below the post, a lever 33 is fulcrumed on a pin 34 extending from the base structure 10, the lever at its outer end having a fulcrum notch 35 receiving the fulcrum edge 36 at the lower end of a bracket 37 secured to and depending from the ram head 14. The bar 26 terminates in the fulcrum edge 38 which engages lever 33 midway between the fulcrum point 34 and the fulcrum edge 36. With this arrangement, the inductor coil 22 will move upwardly with, but at half the rate of upward travel of, the ram head, the inductor coil thus being maintained in symmetrical relation with the work assemblies with its median diametral plane at all times in the plane of the insulating sheet between the opposed faces of the two work assemblies. After the welding operation the two finished billet blanks B are removed from the press, Figure 4 showing one of such blanks. During the welding operation both the billets 20 and the disks 19 were reduced in thickness in axial direction to compensate for the metal upset therefrom, which upsetting increased the diameter of the disks 19 and the adjacent metal in the billets 20.

The billet blanks B are now heated to forging temperature and placed in a piercing die 39, as shown on Figure 5, for application of a piercing punch 40, as shown on Figure 6. Upon application of the piercing punch the metal of the billet blank is displaced and extruded to fill the die opening, the billet body being increased in length with its head portion and the protective layer forming disk domed outwardly to eventually form the head of the finished valve.

In order that the valve seating surface may also be protected against corrosion, corrosion-resistant metal is puddled into a groove 41 formed in the head and this metal is then machined down to form the corrosion-resistant valve seat 42 around the periphery of the valve head, as shown on Figure 7.

With the induction heating method used, a very satisfactory and localized heat distribution is produced at opposite sides of the insulating sheet and a welded billet blank is produced which has no surface defects, and has a more controllable and defined welding line and outside contour, and which does not require machining or forging preparatory to the piercing operation, and after the piercing operation the meeting line between the body 20 and the layer 19 of protective metal has the same profile as in the finished valve. The original flat end to end face surfaces are maintained so that the position of the weld line is known throughout the blank. The upset bead is short and uniform, closely approximating a valve head. The periphery of the bead is unbroken. Thus, with my improved pressure welding arrangement, no material is wasted and considerable labor is eliminated because heretofore necessary shaping steps are no longer necessary.

It will, of course, be understood that various details of construction may be varied through a wide range without departing from the principles of this invention, and it is not the purpose therefore to limit the patent granted hereon otherwise than necessitated by the scope of the appended claims.

I claim as my invention:

1. A pressure welding machine comprising a base, a top structure supported from said base, a fixed anvil suspended from said top structure above said base, a ram piston slidable in said base toward and away from said fixed anvil, an anvil carried by said piston in axially aligned relation beneath said fixed anvil, said anvils adapted to receive therebetween a stack of metal parts to be welded together, a welding head having an aperture therethrough adapted to receive the stack of parts to be welded, means carrying said head between said anvils, a support on said base slidably mounting said means, a lever pivoted on said base, an arm movable with said piston and movable anvil engaging one portion of said lever to raise and lower the lever in accordance with raising and lowering of the movable anvil, and said means carrying said head engaging another portion of said lever closer to the lever pivot than said one portion to raise and lower the head as the movable anvil is raised and lowered but at a lesser rate than the rate of movement of the movable anvil to maintain said head at constant levels relative to the varying levels of the weld line of said stack of parts.

2. In combination with a press having a movable head, a vertical post adjacent said head, a carriage slidable on said post, an arm supported by said carriage projecting over the head, a heating head on said arm, a pivoted lever, means connected to said movable head for swinging said lever about its pivot, and means supporting said carriage on said lever between the swinging means and the pivot whereby said heating head will be moved by the movable head at a lesser rate than the movable head.

EMIL F. GIBIAN.

REFERENCES CITED

The following references are of record in the file of this patent:

UNITED STATES PATENTS

| Number | Name | Date |
|---|---|---|
| 1,152,610 | DeBats | Sept. 7, 1915 |
| 1,775,311 | Halle | Sept. 9, 1930 |
| 1,826,549 | Jardine | Oct. 6, 1931 |
| 1,904,430 | Ferrando et al. | Apr. 18, 1933 |
| 1,915,047 | Blakeslee | June 20, 1933 |
| 2,024,906 | Bennett | Dec. 17, 1935 |
| 2,231,027 | Renner | Feb. 11, 1941 |
| 2,273,609 | Wrighton et al. | Feb. 17, 1942 |
| 2,276,354 | Trainer | Mar. 17, 1942 |
| 2,280,689 | Denneen et al. | Apr. 21, 1942 |
| 2,350,716 | Bissout et al. | June 6, 1944 |
| 2,382,779 | Denneen et al. | Aug. 14, 1945 |